(12) United States Patent
Hekster et al.

(10) Patent No.: US 9,993,116 B2
(45) Date of Patent: Jun. 12, 2018

(54) SAFETY SHOWER WATER TEMPERATURE CONTROL USING GEOTHERMAL ENERGY

(75) Inventors: Floris Hekster, Amsterdam (NL); Chris Woltering, Hoom (NL)

(73) Assignee: Fluor Technologies Corporation, Sugar Land, TX (US)

( * ) Notice: Subject to any disclaimer, the term of this patent is extended or adjusted under 35 U.S.C. 154(b) by 979 days.

(21) Appl. No.: 14/116,291

(22) PCT Filed: Sep. 22, 2011

(86) PCT No.: PCT/US2011/052701
§ 371 (c)(1),
(2), (4) Date: Feb. 12, 2014

(87) PCT Pub. No.: WO2012/154197
PCT Pub. Date: Nov. 15, 2012

(65) Prior Publication Data
US 2014/0150175 A1 Jun. 5, 2014

Related U.S. Application Data

(60) Provisional application No. 61/484,079, filed on May 9, 2011.

(51) Int. Cl.
*A47K 3/28* (2006.01)
*F24D 17/00* (2006.01)
(Continued)

(52) U.S. Cl.
CPC ............ *A47K 3/286* (2013.01); *A61H 35/02* (2013.01); *F24D 17/00* (2013.01); *F24H 1/0072* (2013.01); *A61H 2201/0207* (2013.01); *A61H 2201/0257* (2013.01); *F24D 19/1051* (2013.01); *F24D 2200/11* (2013.01); *F24D 2200/115* (2013.01); *F24J 3/082* (2013.01); *Y02B 10/40* (2013.01); *Y02E 10/125* (2013.01)

(58) Field of Classification Search
CPC ........ A47K 3/286; A61H 35/03; F24D 17/00; F24H 1/0072
USPC ............................................. 4/597, 598, 620
See application file for complete search history.

(56) References Cited

U.S. PATENT DOCUMENTS 3,580,330 A 5/1971 Maugis
3,949,707 A 4/1976 Armstrong et al.
(Continued)

FOREIGN PATENT DOCUMENTS

DE 4131989 4/1993

OTHER PUBLICATIONS

Patent Cooperation Treaty, "Notification of Transmittal of the International Search Report and the Written Opinion of the International Searching Authority, or the Declaration", PCT Application No. PCT/US11/52701, dated Feb. 14, 2012.
(Continued)

*Primary Examiner* — Tuan N Nguyen
(74) *Attorney, Agent, or Firm* — Conley Rose, PC

(57) ABSTRACT

Systems and methods are disclosed for maintaining a temperature of water for a safety shower within a desired range using geothermal energy. A conduit containing at least 150 liters of water can be fluidly coupled to a safety shower through which at least a portion of the water can exit. The conduit can be disposed under ground soil at a depth such that the water buffer is maintained at a temperature of between 15 C to 40 C as a direct function of a thermal inertia of the ground soil.

19 Claims, 3 Drawing Sheets

(51) Int. Cl.
*F24H 1/00* (2006.01)
*A61H 35/02* (2006.01)
*F24J 3/08* (2006.01)
*F24D 19/10* (2006.01)

(56) References Cited

U.S. PATENT DOCUMENTS

| | | |
|---|---|---|
| 3,962,733 A | 6/1976 | Parry |
| 4,084,270 A | 4/1978 | Kersten, Jr. |
| 4,465,020 A | 8/1984 | Schafer |
| 3,274,619 A | 9/1996 | Rolfes |
| 5,647,531 A | 7/1997 | Kline et al. |
| 6,270,014 B1 | 8/2001 | Bollas et al. |
| 2009/0277203 A1 | 11/2009 | Dupraz |
| 2010/0251710 A1 | 10/2010 | Cumplido Matesanz |

OTHER PUBLICATIONS

"How It Works", Water Furnace, http://www.waterfurnace.com/how-it-works.aspx, screen capture Dec. 7, 2010.

SAFETY SHOWER WATER TEMPERATURE CONTROL USING GEOTHERMAL ENERGY

This application claims the benefit of priority to U.S. provisional application having Ser. No. 61/484,079 filed on May 9, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is safety shower systems and methods.

BACKGROUND

Safety showers typically utilize about 90 liters of water per minute for about 15-20 minutes. Due to safety concerns and local and national regulations, the temperature of this water must generally have a temperature within a strict temperature range (e.g., 15-40° C.) as the water exits the safety showers. For these reasons, safety showers can consume large quantities of water, and require significant amounts of energy to heat or cool the water, especially in regions where solar radiation can heat the water above 40° C., or where the ambient temperature can cool the water to temperatures below 10° C.

To maintain the water's temperature within the required range, electrically-operated heating or cooling mechanisms are normally required, which adds disproportionately to the cost of a safety shower system. An exemplary system is discussed in U.S. Pat. No. 4,084,270 to Kersten, Jr. However, without such electrically-operated heating or cooling mechanisms, the water's temperature exiting the safety showers can be uncomfortable, unlawful, and possibly dangerous, dissuading people from using the safety showers for the entirety of the suggested time period.

Although there are safety shower systems without electrically-operated heating or cooling mechanisms such as that described in U.S. Pat. No. 3,949,707, such systems are generally unable to maintain the water's temperature above 10° C. year-round. For example, U.S. Pat. No. 4,465,020 to Schafer discusses placing a portion of an insulated tank below the frost line, such that water in the bottom of the tank can be heated by the ground temperature. The heated water can then be circulated with the remaining water in the tank to prevent the water from freezing. However, Schafer's device is problematic because it contemplates only maintaining the temperature of the water above freezing (0° C.), and such temperatures can still be uncomfortably low and potentially hazardous for use in safety shower systems.

Various geothermal heating and cooling systems are also known in the art, such as the WaterFurnace™ (http://www.waterfurnace.com). However, such systems known to Applicants fail to contemplate maintaining a water buffer for a safety shower system at a temperature of between 15° C.-40° C.

Thus, there is still a need for safety shower systems and methods that utilize geothermal energy to maintain a temperature of water in a water buffer between 15° C.-40° C.

SUMMARY OF THE INVENTION

The inventive subject matter provides apparatus, systems and methods in which a safety shower system can maintain a temperature of a water buffer between 15° C.-40° C. using geothermal energy. As used herein, the term "safety shower" includes safety or emergency showers, eyebath or eyewash stations, hand-held drench hoses, eye/face wash stations, and any other safety or emergency rinsing station and combination(s) thereof. However, it is contemplated that the systems and methods discussed herein could alternatively be utilized in other systems where the temperature of a fluid having a temperature of between 15° C.-40° C. is critical to the system's operation or use.

Contemplated safety shower systems can include a safety shower through which at least a portion of a water buffer can exit. A conduit containing the water buffer can be fluidly coupled to the safety shower. Rather than require an active, electrically-operated heating or cooling mechanism to maintain the water's temperature within a desired range, it is especially preferred that the water buffer is disposed beneath the ground soil at a depth of at least 0.3 meters, such that the thermal inertia of the ground soil can maintain the water buffer's temperature between 15° C. to 40° C. In this manner, the predictability of the soil temperature can be used as a passive temperature control for the safety shower systems, which eliminates the need for expensive, active temperature control mechanisms that are electrically-operated and can require regular maintenance.

Because of the large quantity of water needed, and often required, for a safety shower, the safety shower system preferably includes a water buffer having a volume of at least 150 liters, more preferably at least 1,000 liters, and most preferably at least 1,500 liters. However, the specific volume of the water buffer can vary depending upon the requirements of the specific jurisdiction where the safety shower system is installed including, for example, the required number of safety showers, the required flow rate of water within the system, and the minimum usage duration required. In the United States, for example, current federal regulations require emergency showers to have a flow rate of 20 gpm (75.7 lpm), and eye wash stations to have a flow rate of 0.4 gpm (about 1.5 lpm), and require water to have a temperature between 60-100° F. (15.6-37.8° C.). At a recommended usage of at least 15 minutes, this translates to a volume of at least 22.7 liters of water for eye washing, and 1135.5 liters for showers.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In one aspect, methods of maintaining a temperature of a water buffer within a desired range using geothermal energy are also contemplated. In such methods, a temperature range of a ground soil can be measured to determine a minimum depth of the ground soil at which a temperature is between 15° C. to 40° C. A conduit can then be placed underground at or below the minimum depth, and is preferably sized and dimensioned such that the conduit can contain a water buffer of at least 150 liters.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including the ability to maintain a water buffer for a safety shower system at a temperature between 15° C. to 40° C. without the need for electrically-operated heating or cooling mechanisms. This advantageously can reduce the initial and on-going cost of the safety shower system while providing a reliable source of temperate water for the safety shower.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
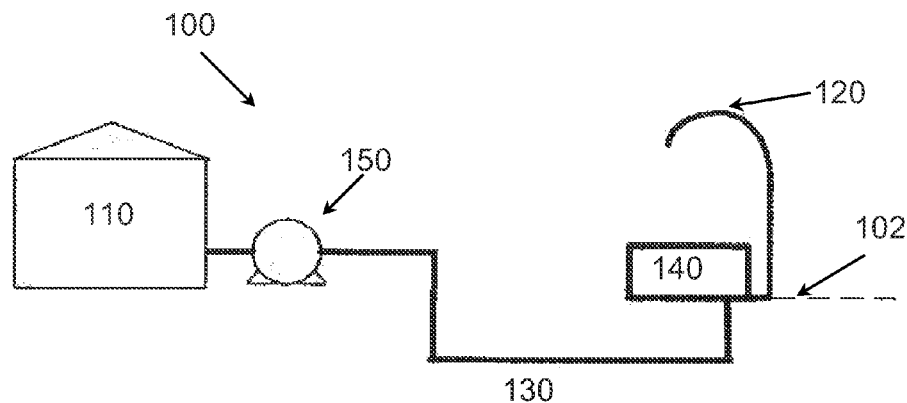
FIG. 1 is a schematic of a prior art safety shower system having an active temperature control system.

An exemplary prior art safety shower system 100 is shown in FIG. 1. The system 100 includes a water tank 110 disposed above-ground 102, and can be fluidly coupled to an emergency shower 120 via conduit 130. A pump 150 can be included along the conduit 130 to maintain a sufficient pressure of the water within system 100. In order to maintain the temperature of the water within a required range, the system 100 includes an electrically-operated heating and cooling mechanism 140 that can heat or cool the water as needed prior to the water exiting the emergency shower 120. The inclusion of the heating and cooling mechanism 140 is disadvantageous because the power required by mechanism 140 increases the initial and on-going costs of the system 100, especially during temperature extremes.

Figure 2:
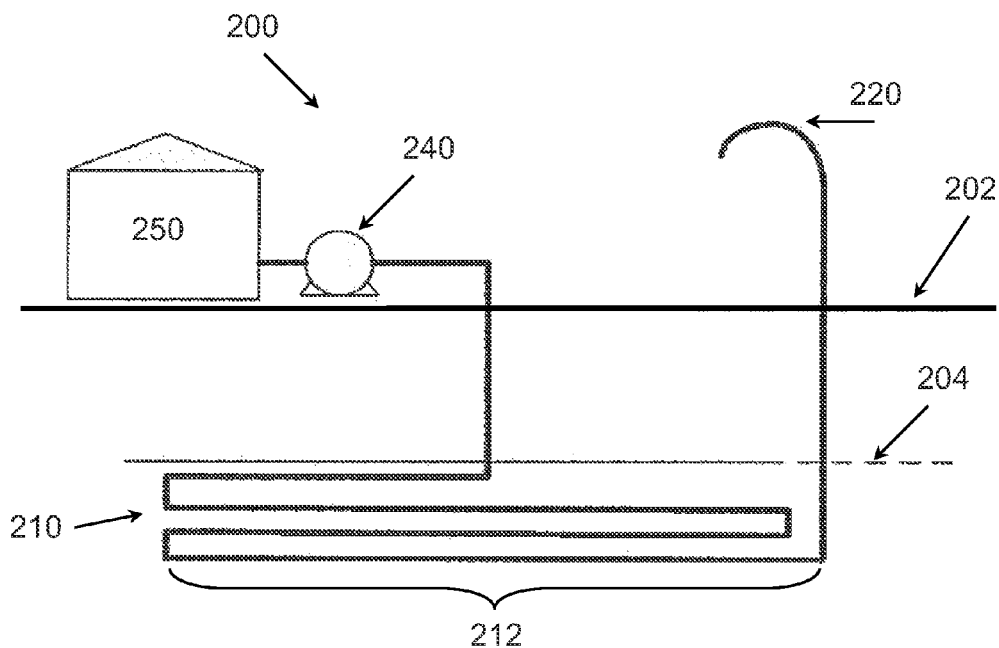
FIGS. 2-4 are schematics of various embodiments of safety shower systems that maintain a temperature of water within a desired range using geothermal energy.

FIG. 2 illustrates one embodiment of a safety shower system 200 that advantageously eliminates the need for electrically-operated heating or cooling mechanisms. Rather, the safety shower system 200 utilizes geothermal energy to maintain a temperature of a water buffer 212 within a desired range by placing a conduit 210 containing the water buffer 212 underneath the top soil 202 at a depth of at least 0.3 meters. Because the temperature of the soil is relatively stable at a certain level 204 below grade, water within the portion of conduit 210 disposed at or beneath that level 204 can be maintained at or about the temperature of the soil at that level 204. However, the specific depth where the conduit 210 is placed can vary depending upon the geographical locale where system 200 is installed.

As discussed above, conduit 210 is preferably disposed beneath the top soil 202 at a depth sufficient to maintain the water buffer 212 within conduit 210 at a temperature of between 15° C. to 40° C., and more preferably, between 20° C. to 40° C. The actual depth at which the conduit 210 is laid will depend upon the geographical location where safety shower system 200 is installed. It is contemplated that the conduit 210 could be disposed at a depth of at least 0.5 meters beneath the ground soil, and depths of 1 meter or more are also contemplated. For example, the soil temperature at a depth of 1 meter in Saudi Arabia would typically be sufficient to maintain the water buffer 212 within the conduit 210 at a temperature of between 15° C. to 40° C. However, in other countries and locales, the specific depth could very well be lesser or greater.

In this manner, the temperature of the water buffer 212 in the conduit 210 can be maintained within a temperature range that is preferably between 15-40° C. as a direct function of a thermal inertia of the soil. If the volume of water in the water buffer 212 is greater or equal to the volume required to ensure a continuous flow of water for 15-20 minutes at the required flow rate, the system 200 is thus intrinsically safe and extremely energy efficient because of the system's passive heating and cooling control.

It is contemplated that system 200 can include an emergency shower 220 through which at least a portion of the water buffer 212 can exit. Alternatively or additionally, system 200 can include, for example, an eyebath or eyewash station, a hand-held drench hose, an eye/face wash station, and other commercially suitable safety showers and any combination(s) thereof. The specific number and type of safety showers will likely depend on the requirements of the specific jurisdiction where system 200 is installed.

Conduit 210 is preferably sized and dimensioned such that the conduit 210 can contain a water buffer 212 of at least 150 liters, more preferably at least 300, 600, and more than 1,000 liters, and most preferably at least 1,500 liters. However, the storage capability of the conduit 210 can vary depending upon the requirements of the specific jurisdiction where system 200 is installed. Conduit 210 can have a length and circumference that is sufficient to not only contain the water buffer 212, but also ensure that the water buffer 212 has a temperature of between 15° C. to 40° C. as water flowing through conduit 210 exits the emergency shower 220. Thus, for example, a conduit having a short length and a large circumference might be sufficient to hold the required volume of the water buffer, but could be insufficient to ensure that the water flowing through the conduit at a high flow rate is at the required temperature range when it exits the emergency shower 220 because the water will have less time and opportunity to be heated or cooled by the thermal inertia of the ground soil. Thus, the flow rate of the water buffer 212 though the conduit 210 should also be such that water in the water buffer 212 can have a temperature of between 15° C. to 40° C. when it exits the emergency shower 220, while also ensuring that the water exiting the emergency shower 220 is at a required flow rate, if any.

Ideally, the circumference of the conduit 210 is such that the water flowing through the conduit 210 can be heated or cooled as needed such that when the water exits the conduit 210, the water has a temperature of between 15° C. to 40° C. Maintaining the water buffer 212 within the required temperature range can be critical, given the emergency uses of the emergency shower 220 and the need for an immediate flow of water having a temperature within the required range.

For example, if system 200 having emergency shower 220 were to be used in the United States, under current regulations the water from the water buffer 212 must flow from the emergency shower 220 at a flow rate of approximately 75.7 lpm for a duration of at least 15 minutes. This would require a total volume of 1135.5 liters of water. A conduit 210 having an inside diameter of six inches (15.24 cm) would therefore require a length of approximately 63 meters to contain the water buffer 212 beneath the top soil 202 while maintaining the temperature of the water in water buffer 212 between 15° C. to 40° C. It is contemplated that the length of the conduit 210 could be greater than what is needed to contain the water buffer 212, such that the conduit 210 could be fluidly coupled to emergency shower 220, pump 240, or other components of the system 200. Alternatively, additional conduits could be fluidly coupled to the conduit 210 to couple the conduit 210 to other components of system 200.

In some contemplated embodiments, system 200 could include a water storage tank 250 that contains a secondary source of water to replenish water buffer 212. For example, it is contemplated that the water buffer 212 could comprise a minimum volume of water required under local regulations, with the water storage tank 250 comprising an additional water source such that the total volume of water meets the required volume of water for system 200. The water storage tank 250 can be fluidly coupled to conduit 210, such that water from tank 250 can flow through conduit 210 and exit emergency shower 220.

System 200 is preferably configured such that water contained in the water storage tank 250 can be heated or cooled as needed by the thermal inertia of the ground soil 202 as the water flows through conduit 210. In this manner, even if the water storage tank 250 is disposed above the top soil 202, which could cause the water in tank 250 to have a temperature of less than 15° C. or greater than 40° C. depending upon the local climate, the water flowing from water storage tank 250 can still exit the emergency shower 220 at a temperature of between 15° C. to 40° C. through heat exchange within conduit 210 and without the use of electrically-operated cooling or heating mechanisms. In such configurations, the length and diameter of the conduit 210 should be such that conduit 210 is sufficient to heat or cool the water as needed as the water flows through the conduit 210. It is contemplated that the length and diameter of conduit 210 will likely vary depending upon the flow rate of water through the conduit 210. Thus, for example, water flowing at a higher rate through conduit 210 will likely require conduit to have a smaller diameter and a greater length than if the water were to flow at a lesser flow rate.

In some contemplated embodiments, a pump 240 can be included to regulate the pressure of the water within conduit 210. In other contemplated embodiments, conduit 210 could have or be fluidly coupled to one or more flow regulators including, for example, reducers, expanders, and other commercially suitable regulators, such that the flow rate of water within conduit 210 could vary from the flow rate of water from the emergency shower 220.

Although conduit 210 is shown extending vertically beneath the top soil 202 in a zigzag fashion, it is further contemplated that conduit 210 can extend horizontally or diagonally with respect to the top soil 202, or any combination(s) thereof, and could extend in a zigzag, spiral, coil, straight line, or any other commercially suitable manner or combination(s) thereof.

Figure 3:
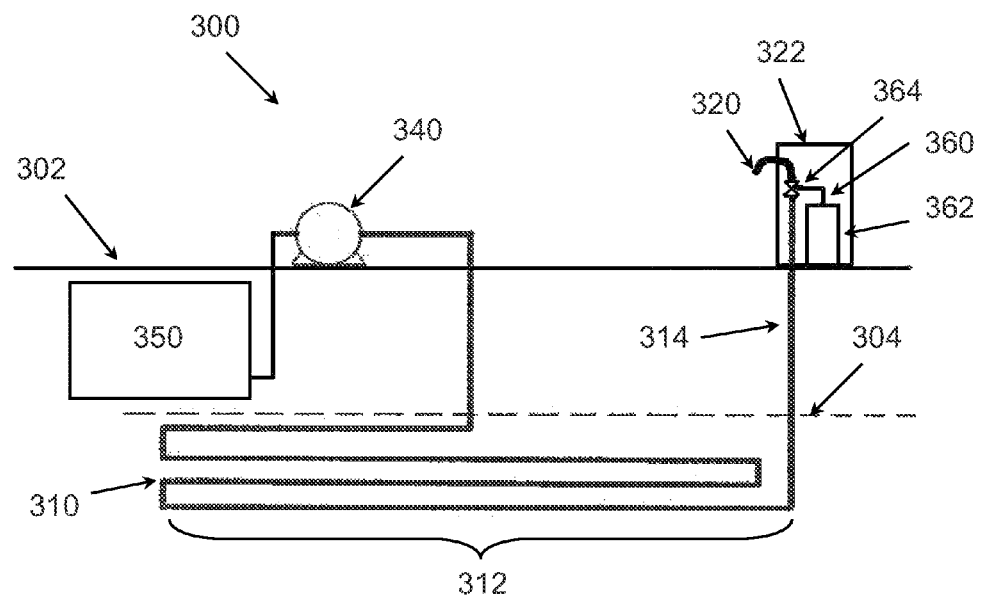

In FIG. 3, an alternative embodiment of a safety shower system 300 is shown having a safety shower housing 322, and a conduit 314 that fluidly couples a safety shower 320 to conduit 312. The housing 322 can include a dead volume riser 360 or other device such that the portion of water in conduit 314 that may not be within the required temperature range can be diverted from the safety shower 320. This can advantageously eliminate the need for insulation about the conduit 314.

The dead volume riser 360 can include a tank 362 where an initial volume of water from conduit 314 and possibly conduit 312 can be stored. After the water level in tank 362 reaches a defined threshold, a valve 364 can close allowing water to flow to the safety shower 320.

It is contemplated that a secondary water storage tank 350 can be disposed beneath the top soil 302 to better insulate the tank 350 from the external climate. However, tank 350 could alternatively be partially disposed beneath the top soil 302 or disposed above the top soil 302. With respect to the remaining numerals in FIG. 3, the same considerations for like components with like numerals of FIG. 2 apply.

Figure 4:
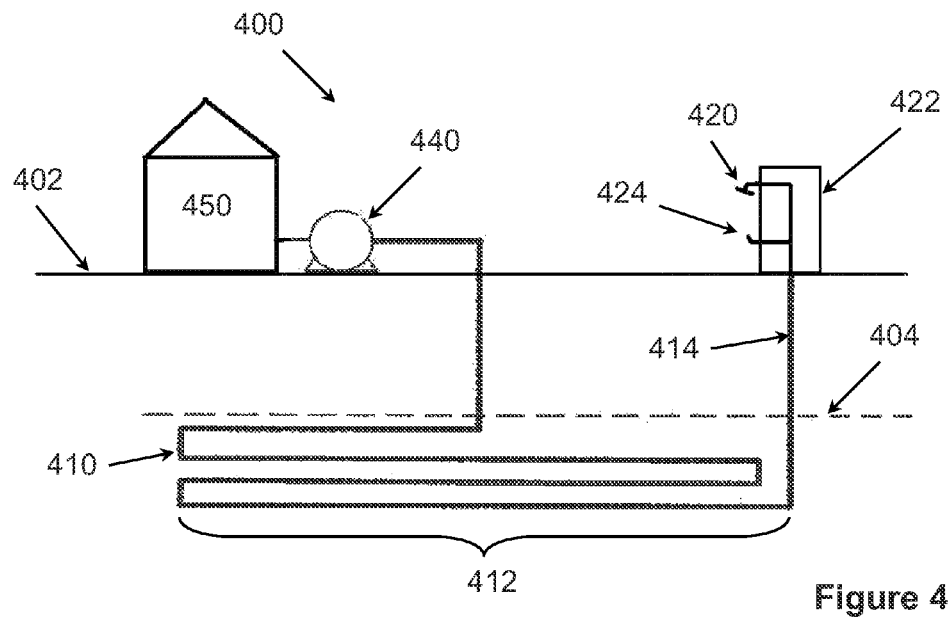

FIG. 4 illustrates yet another embodiment of a safety shower system 400 having an emergency shower 420 and an eye washing station 424. With respect to the remaining numerals in FIG. 4, the same considerations for like components with like numerals of FIG. 2 apply.

Figure 5:
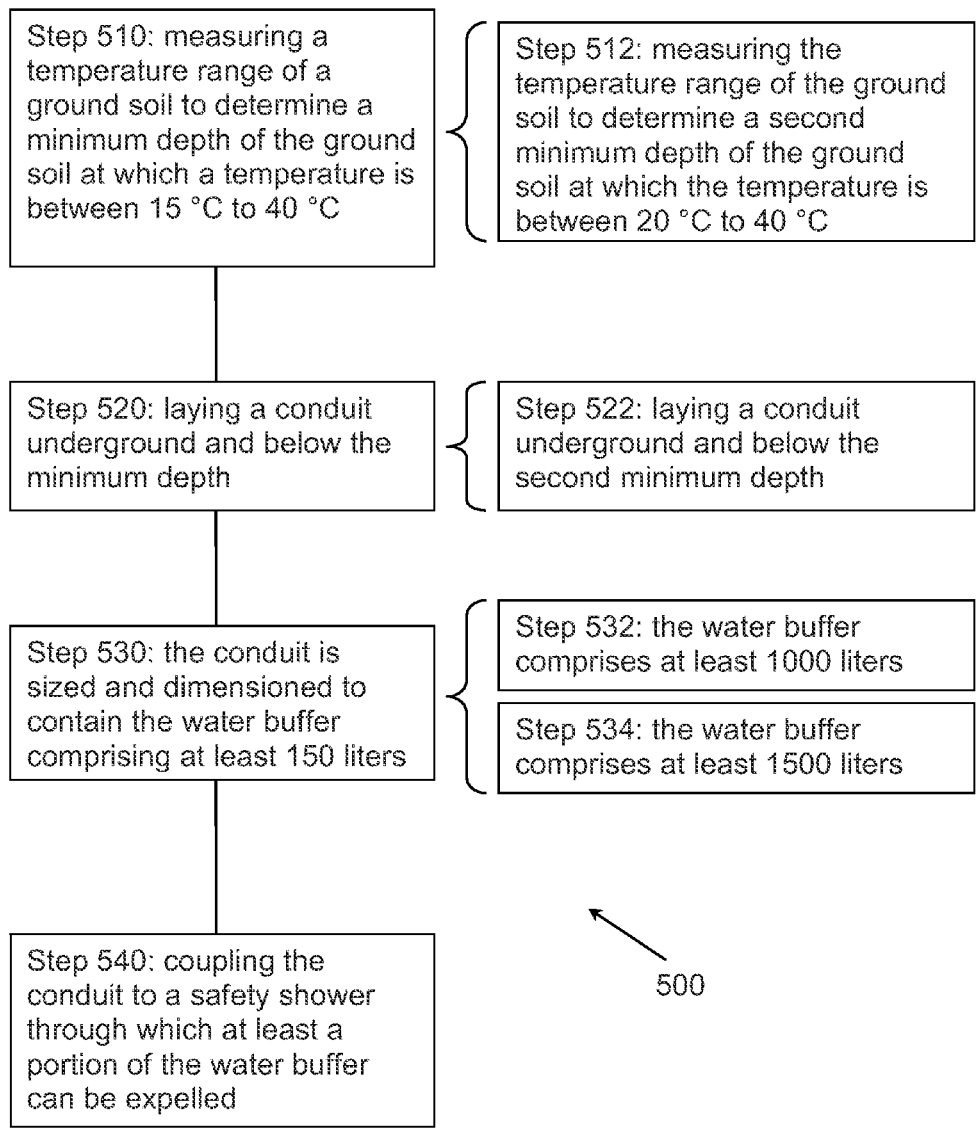
FIG. 5 is a flow chart of a method of maintaining a temperature of a water buffer using geothermal energy.

FIG. 5 illustrates various steps in a method 500 of maintaining a temperature of a water buffer within a desired temperature range using geothermal energy. To accomplish this, step 510 requires measuring a temperature range of a ground soil to determine a minimum depth of the ground soil having a temperature between 15° C. to 40° C. In step 520, a conduit can then be laid underground at or below this minimum depth.

The conduit can be sized and dimensioned to contain a water buffer comprising at least 150 liters in step 530, at least 1000 liters in step 532, or at least 1500 liters in step 534.

It is contemplated in step 512 that a temperature range of the ground soil could be measured to determine a second minimum depth of the ground soil at which the temperature is between 20° C. to 40° C. In such contemplated embodiments, the conduit in step 522 can be laid underground at or below the second minimum depth.

In step 540, the conduit can be coupled to a safety shower through which at least a portion of the water buffer can be expelled.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A safety shower system configured to maintain a water buffer at a temperature within a desired range using geothermal energy, comprising:
   a tank containing water;
   a safety shower; and
   a conduit fluidly coupling the tank and the safety shower, wherein in the conduit contains a portion of the water, wherein the conduit is at least partially disposed below ground level in soil at a depth of at least 0.3 meters, wherein a portion of the water within the portion of the conduit disposed below ground level is the water buffer, wherein the conduit and the depth of the conduit are configured to maintain the water buffer at a temperature of between 15° C. to 40° C. within the conduit as a direct function of a thermal inertia of the ground soil, wherein the water buffer has a volume of at least 150 liters;

wherein the safety shower is configured to expel at least a portion of the water buffer contained in the conduit.

2. The safety shower system of claim 1, wherein the water buffer is at least 1000 liters.

3. The safety shower system of claim 1, wherein the water buffer is at least 1500 liters.

4. The safety shower system of claim 1, wherein the conduit and the depth of the conduit are configures to maintain the water buffer at a temperature of between 20° C. to 40° C.

5. The safety shower system of claim 1, wherein the conduit is disposed beneath the ground soil at a depth of at least 0.5 meters.

6. The safety shower system of claim 1, wherein the conduit is disposed beneath the ground soil at a depth of at least 1.0 meter.

7. The safety shower system of claim 1, wherein the conduit, the water buffer, and the safety shower are configured such that a flow rate of the water buffer through the conduit maintains the water buffer at a temperature of between 15° C. to 40° C.

8. The safety shower system of claim 1, further comprising:

a pump;

wherein the pump and the conduit are each configured such that water from the tank replenishes the water buffer, and wherein the pump, the conduit, and the safety shower are configured so that the water buffer exits the safety shower at a temperature of between 15° C. to 40° C.

9. The safety shower system of claim 8, wherein the conduit has a diameter and a length configured to heat or cool the water as the water flows from the tank through the conduit.

10. The safety shower system of claim 8, wherein at least a portion of the water in the tank has a temperature that is less than 15° C. or greater than 40° C.

11. The safety shower system of claim 8, wherein the pump is configured such that a flow rate of the water flowing through the conduit allows water from the tank to be heated or cooled by the thermal inertia in the conduit.

12. A method of maintaining a water buffer for use via a safety shower at a temperature within a desired range using geothermal energy, comprising:

determining a minimum depth of the ground soil at which a temperature is between 15° C. to 40° C.;

laying a conduit underground at or below the minimum depth, wherein the conduit is sized and dimensioned to contain a water buffer of at least 150 liters, wherein the water buffer comprises water within the conduit;

coupling the conduit to the safety shower such that at least a portion of the water buffer contained in the conduit is configured to be expelled via the safety shower;

maintaining the water buffer within the conduit at a temperature between 15° C. to 40° C.;

flowing water from a tank through the conduit at a flowrate; and maintaining the water buffer at a temperature between 15° C. to 40° C. based on the flowrate.

13. The method of claim 12, further comprising:

measuring the temperature range of the ground soil to determine a second minimum depth of the ground soil at which the temperature is between 20° C. to 40° C.; and laying the conduit underground at or below the second minimum depth that is greater than the minimum depth.

14. The method of claim 12, wherein the water buffer comprises at least 1000 liters.

15. The method of claim 12, wherein the water buffer comprises at least 1500 liters.

16. The method of claim 12, wherein the minimum depth is at least 0.3 meters.

17. The method of claim 12, wherein the minimum depth is at least 0.5 meters.

18. The method of claim 12, wherein the minimum depth is at least 1.0 meter.

19. The method of claim 12, further comprising:

heating or cooling the water from the tank as the water flows from the tank through the conduit, wherein the water in the tank has a temperature that is less than 15° C. or greater than 40° C.

* * * * *

UNITED STATES PATENT AND TRADEMARK OFFICE
CERTIFICATE OF CORRECTION

PATENT NO. : 9,993,116 B2
APPLICATION NO. : 14/116291
DATED : June 12, 2018
INVENTOR(S) : Floris Hekster and Chris Woltering Page 1 of 1

It is certified that error appears in the above-identified patent and that said Letters Patent is hereby corrected as shown below:

Column 7, Line 17, please replace "configures" with --configured--

Signed and Sealed this
Fourth Day of September, 2018

Andrei Iancu
*Director of the United States Patent and Trademark Office*